R. H. MONTEITH.
Grain-Separator.

No. 197,486.  Patented Nov. 27, 1877.

Attest:
Alexander Mahon
John G. Center.

Inventor:
Robert H. Monteith,
by A. M. Smith,
Attorney.

UNITED STATES PATENT OFFICE.

ROBERT H. MONTEITH, OF EAU CLAIRE, WISCONSIN, ASSIGNOR OF A PART OF HIS RIGHT TO CHAS. H. BIGELOW AND HUGH L. PILKINGTON, OF ST. PAUL, MINNESOTA, AND ARCHIE McVICAR AND DAVID P. BARNES, OF EAU CLAIRE, WISCONSIN.

IMPROVEMENT IN GRAIN-SEPARATORS.

Specification forming part of Letters Patent No. 197,486, dated November 27, 1877; application filed May 14, 1877.

*To all whom it may concern:*

Be it known that I, ROBERT H. MONTEITH, of Eau Claire, county of Eau Claire, State of Wisconsin, have invented certain new and useful Improvements in Grain Thrashers and Separators, of which the following is a full, clear, and exact description, reference being had to the accompanying drawings, making part of this specification, in which—

Figure 1:
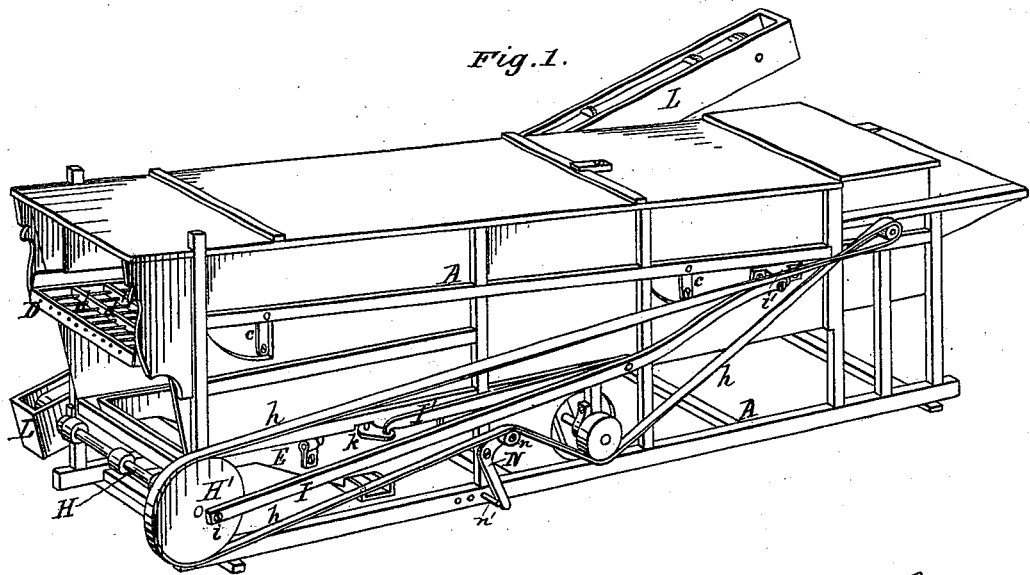
Figure 2:
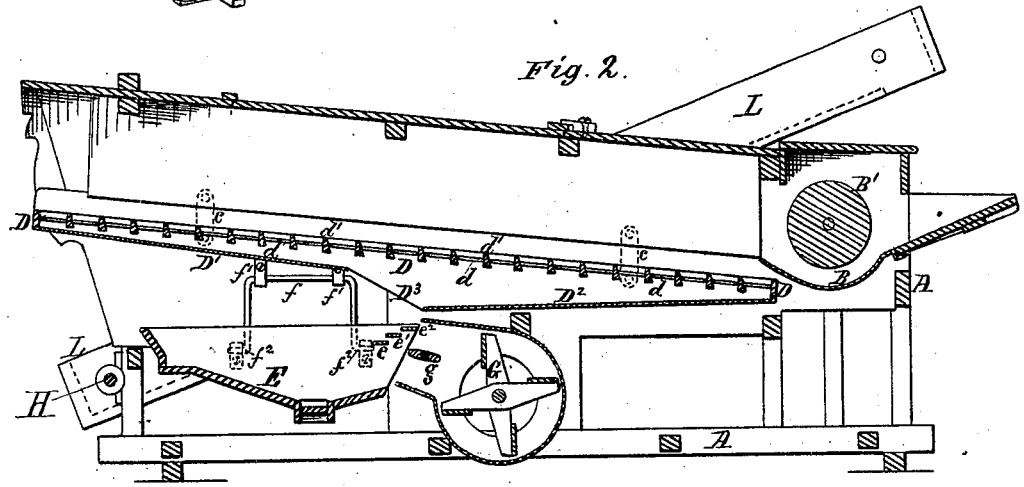

Figure 1 represents a perspective view of a thrasher and separator embracing my improvements; Fig. 2, a vertical longitudinal section through the same; and Fig. 3, a transverse section through the tailings-elevator.

Similar letters of reference denote corresponding parts wherever used.

My invention relates to a novel construction of the separating-shaker or straw-carrier, to the arrangement of means for operating said carrier, and the shoe and elevator, and to the construction of the tailings-elevator, as hereinafter fully explained.

In the accompanying drawing, A represents a strong rectangular upright frame-work, of any suitable construction, for the support of the operating parts hereinafter described. Within this frame, at its forward end, is arranged the thrasher-concave B, and the thrashing-cylinder B', the shaft of which is mounted in suitable bearings in the frame A, said shaft extending outside of or beyond its bearings, and being provided at one end with a pulley which receives motion from the driving power, and which is communicated thence to the other operative parts of the machine, as will be explained.

Directly in rear of the thrasher-concave, and with its forward end projected slightly under the same, so as to receive the straw and grain therefrom, is the straw carrier and shaker, suspended from the frame A, upon pendent pivoted links $c$ $c$, so arranged that at the end of the forward throw of the carrier the links will assume a vertical or nearly vertical position, in such manner that the vibration of the carrier or shaker thereon will be backward and upward, for giving a tossing motion to the straw and grain lying upon it, while the return movement will be downward and forward, for withdrawing it underneath the straw, &c., thrown up in its rearward and upward movement. This movement may be varied as desired, to adapt it to the grain operated upon by an adjustment of the angle of relation of the suspending-links.

The shaker or carrier consists of an open rectangular frame, D, of wood or other suitable material, provided with rods, wires, or slats $d$, stretched longitudinally from end to end, and having a sufficient space between them to permit the grain, chaff, &c., to pass readily through, while, at the same time, they are near enough together to prevent the passage of the straw between them and to insure its passage over the carrier.

The rods or wires pass through a series of perforated transverse bars, $d'$, placed sufficiently near together to uphold the straw above the longitudinal rods or wires $d$, and which, at the same time, serve to support said wires and prevent their sagging.

The bars $d'$ are beveled on their forward faces in such manner that while they impede the passage of the loose grain over the carrier, and serve to insure its escape between the wires, they do not seriously retard the movement of the straw over the carrier.

The shaker is provided with a close bottom, $D^1$ $D^2$, arranged underneath the wires $d$, slightly removed therefrom at the ends, and diverging thence both ways, in hopper form, toward the center at $D^3$, where there is an opening permitting the escape of the grain into the shoe arranged underneath said opening to receive it.

The shoe E, which is made substantially in the usual form, is suspended upon bails $f$, one upon each side, mounted in bearing-brackets $f^1$, attached to the inner side walls of the main frame, as shown in Fig. 2; and the pendent arms of these bails are provided with angular projections or hooks $f^2$, which engage with eyes or perforated brackets on the sides of the shoe, the arrangement being such as to permit the free lateral vibration of the shoe on the suspending-bails.

The forward end of the shoe adjacent to the fan G, and which is located underneath the opening $D^3$ in the hopper bottom $D^1 D^2$ of the shaker, so as to receive the grain therefrom, is provided with a series of transverse slats, $e \ e^1$, &c., placed flatwise or horizontally, and one in advance of another, so as to resemble short, narrow steps, having a sharp descent, as shown, with spaces between them to permit the passage of and to give direction to the currents of air from the fan. Just in front of these slats, and within the discharge-outlet to the fan-case, is a narrow centrally-pivoted valve, $g$, so arranged that it may be made to close or partly close the space between the steps $e \ e^1$, &c., when desired. By this arrangement of the valve $g$ the currents of air from the fan can be turned directly between the slats, or, by turning the valve so as to partially cross the slats, the current of air can be divided and passed out partly above the valve to the upper slats and partly below to the screens in the shoe, according to the requirements of the grain operated upon.

At the rear end and lower corner of the machine is a transverse shaft, H, mounted in suitable bearings on the main frame, and provided at one end with a sheave and crank-wheel, H', to which motion is imparted by a belt, $h$, from a pulley on the thrashing-cylinder shaft, as shown, and this shaft H, which is provided with a roller or a series of pulleys, and constitutes the driving shaft or roller for the stacker, is also made to impart motion to the shaker or straw-carrier, the shoe, and the tailings-elevator, as follows: The outer face of the sheave H' is provided with a crank-wrist at $i$, with which one end of a long bent connecting-rod, I, is attached, the other end reaching forward and upward to, and being connected with, a stud or pin at $i'$, attached to the shaker, and projecting laterally through a slot or opening in the frame-casing, as shown, this arrangement serving to impart the required longitudinal vibration to the straw-carrier. To this rod or pitman, I, at or near midway of its length, is pivoted a second rod or pitman, I', which extends rearward, and has its rear end connected with one arm of an elbow or bell-crank lever, $k$, pivoted on the main frame, and connected by a short link with the shoe E, in such manner as to impart a short, sharp lateral vibration thereto. The end of shaft H, opposite to that armed with the sheave H', is provided with a driving sheave or roller, located within the lower end of the tailings-elevator spout or trough L.

Figure 3:

A transverse section of this elevator is shown in Fig. 3, where the box or trough bottom is made concave or in trough form, in such manner that the tailings or contents to be elevated will be thrown toward the center.

The elevator consists of an endless band or belt, $m$, driven by the pulley on the end of shaft H, and provided with a number of transverse slats, bars, or buckets, $m'$, made convex on their outer face in transverse section, as shown in Figs. 1 and 3. By this construction of the tailings-elevator, the tailings will be carried up and returned to the thrasher with less friction and less of the tendency to clog, caused by the barbs on the heads, than where the trough and buckets are rectangular in section.

The tailings-elevator, shoe, and straw-carrier being thus all operated from the stacker-shaft, and this, in turn, being driven by the long belt $h$, to keep the latter always taut and prevent its slipping a belt-tightener is employed, consisting of an elbow-lever, N, pivoted on the frame A, and provided with a friction-roller, $n$, on its short upper arm, resting in contact with the belt $h$, as shown. The lower long arm of this lever extends down by the side of the lower longitudinal frame-timber, and may be moved back and forth, and held by a pin at $n'$, entering any one of a series of perforations in said timber, for regulating the pressure of the roller $n$ on the belt and the tightness of said belt on its pulleys, as desired. This forms a convenient and simple arrangement of belt-tightener, and one not liable to get out of order.

Parts of the machine, such as the cylinder-concave, fan, straw-stacker, &c., not particularly described, may be of any usual or preferred construction and arrangement.

Having now described my invention, what I claim as new, and desire to secure by Letters Patent, is—

1. In a combined thrashing-machine and separator, a vibrating straw-carrier and separating-floor, composed of rods or wires $d$, stretched lengthwise of said carrier, and forming the separating-screen, combined with and supported by transverse slats or bars $d'$, arranged to uphold and carry the straw above the wires $d$, as described.

2. The vibrating separating-floor and straw-carrier, vibrating shoe, and tailings-elevator, all connected with and operated from the stacker-shaft, substantially as described.

3. The slats $e \ e^1 \ e^2$, arranged horizontally in short narrow steps, having a sharp descent intermediate between the vibrating hopper bottom of the separating-floor and the screens in the shoe, in combination with the narrow centrally-pivoted valve $g$, arranged and operating as and for the purpose described.

4. In a combined thrashing-machine and separator, a tailings-elevator having a concave floor, in combination with the carrying blocks or buckets on the endless belt having a convex surface matching the concave floor, as described.

In testimony whereof I have hereunto set my hand this 4th day of May, A. D. 1877.

ROBERT H. MONTEITH.

Witnesses:
L. D. WILKES,
R. C. MOORE.